United States Patent [19]

Kristiaan

[11] Patent Number: 4,730,554

[45] Date of Patent: Mar. 15, 1988

[54] APPLIANCE FOR THE ALIGNMENT OF ONIONS OR OTHER VEGETABLE BULBS

[75] Inventor: Gerard J. Kristiaan, Wageningen, Netherlands

[73] Assignee: Instituut voor Bewaring en Verwerking Van Lanbouwprodukten, Wageningen, Netherlands

[21] Appl. No.: 772,853

[22] Filed: Sep. 5, 1985

[30] Foreign Application Priority Data

Sep. 6, 1984 [NL] Netherlands .......................... 8402721

[51] Int. Cl.[4] .......................... A23N 15/08; A23P 1/00
[52] U.S. Cl. ......................................... 99/546; 99/549; 99/636; 198/396; 198/662
[58] Field of Search .......... 99/485, 516, 536, 537–540, 99/467, 584–589, 593, 594, 549, 550, 623–625, 628; 426/481–483; 198/396, 392, 467.1, 662, 660

[56] References Cited

U.S. PATENT DOCUMENTS

| | | |
|---|---|---|
| 1,581,071 | 4/1926 | Lowe . |
| 2,332,093 | 10/1943 | Lowe . |
| 4,237,782 | 12/1980 | Bichel .................................. 99/516 |
| 4,355,572 | 10/1984 | Silverstrini ........................... 99/516 |
| 4,470,345 | 9/1984 | Miyata ............................... 99/584 X |
| 4,476,778 | 10/1984 | Clyma ............................... 99/546 X |
| 4,481,875 | 11/1984 | Toyosato ............................... 99/584 |
| 4,527,438 | 7/1985 | Fosslien ......................... 198/467.1 X |

FOREIGN PATENT DOCUMENTS

| | | |
|---|---|---|
| 0114715 | 1/1984 | European Pat. Off. . |
| 2819240 | 5/1977 | Fed. Rep. of Germany . |
| 2200775 | 4/1974 | France . |
| 0078676 | 5/1984 | Japan .............................. 99/584 X |
| 0095876 | 6/1984 | Japan .............................. 99/584 X |
| 0090260 | 9/1958 | Netherlands . |
| 7513320 | 11/1975 | Netherlands . |
| 0821315 | 10/1959 | United Kingdom .................... 28/2 |

Primary Examiner—Timothy F. Simone
Attorney, Agent, or Firm—Hopgood, Calimafde, Kalil, Blaustein & Judlowe

[57] ABSTRACT

The invention deals with an appliance with which onions or other vegetable bulbs can be oriented with their axial direction in a particular position necessary to present the onions to a processing machine for instance for the removal of top and root ends, the removal of the outermost skins and the cutting of the onions into slices. In a first embodiment the alignment appliance comprises a cylinder 2, 3 with a helical groove in the outer surface thereof, a roller 1 provided next to said cylinder and a means of driving 8 to rotate the groove cylinder and the roller, both the width of the groove and the minimum distance between the groove cylinder 2, 3 and the roller 1 being less than the diameter and axial length of the onions to be aligned. In a second embodiment the appliance comprises a cylinder 2, 3 with a helical groove in the inside surface thereof and means for rotating the grooved cylinder, the width of the groove being less than the diameter and axial length of the onions to be aligned.

20 Claims, 6 Drawing Figures

APPLIANCE FOR THE ALIGNMENT OF ONIONS OR OTHER VEGETABLE BULBS

BACKGROUND OF THE INVENTION

1. Field of the Invention

The invention relates to an appliance for the alignment of onions or other vegetable bulbs.

2. Description of the Prior Art

Onions intended for consumption must in general be subjected to one or more processes. These processes may be, inter alia: the removal of top and root ends, the removal of the outermost skins and the cutting of the onions into slices. If these processes do not take place by hand but by machine, the onions will have to be presented to the respective processing machine with their axial direction in a particular position. This oriented presentation can of course take place by hand, but this is a labour-intensive, relatively costly job.

OBJECTS OF THE INVENTION

The objective of the invention is to provide an appliance for the alignment of onions or other vegetable bulbs to a position in which the line through the top and the root end takes up a particular position, the onions not undergoing any mechanical damage as a result of the alignment and virtually 100% of the onions to be aligned being oriented to the correct position, even if there are large differences in shape between the onions.

DESCRIPTION OF INVENTION

According to a first design of the invention such an alignment appliance comprises a cylinder with a helical groove in the outer surface thereof, a roller provided next to the said cylinder and means of driving in order to rotate the grooved cylinder and the roller, both the width of the groove and the minimum distance between the grooved cylinder and the roller being less than the diameter and axial length of the onion to be aligned.

It emerges that if the onions are introduced between the grooved cylinder ano the roller, the onions land in the helical groove, are transported to the removal end of the cylinder and thereby are oriented in a manner such that the line between head and root end becomes parallel to the centre line of cylinder and roller. Even onions of very different shape, for example very flat onions, undergo this orientation. Because the oriented onions are situated on the outside of the grooved cylinder, they can easily be removed from the cylinder and presented to a processing machine, for example knives which cut off the head and root end, without the orientation being lost.

The same good orientation is obtained in a second design according to the invention based on the same idea, in which the appliance is provided with a cylinder with a helical groove on the inside surface thereof and means for rotating the grooved cylinder and in which the width of the groove is less than the diameter and axial length of the onions to be aligned.

The width of the helical groove must be matched to the dimensions of the onions. If only graded onions whose dimensions lie between fixed narrow limits are oriented, the width of the helical groove can always be the same and the grooved cylinder can consist of a tube in the inner or outer surface of which the groove is recessed. In general, however, it is preferable if the width of the helical groove can be adjusted and can thus be matched to different onion dimensions.

An appliance in which the width of the helical groove can easily be adjusted comprises two helical rods of equal diameter which are mounted on a common spindle to be driven in a rotary manner and between which the helical groove is situated, while the axial distance between the helical rods is adjustable.

The onions must only land in a groove of the desired adjusted width between the helical rods there is also a helical groove which is not intended for the orientation of the onions and to prevent the onions landing in this groove use is made of a fill-up helix which extends between two pairs of windings of the said helical rods. This fill-up helix will have a diameter in the said first design of the invention which is somewhat larger than the diameter of the helical rods which limit the orientation groove, while in the said second design the fill-up helix will have a diameter which is somewhat less than the diameter of the helical and which limit the orientation groove. To remove the well positioned onions from the alignment helix use can be made of s gripping jaw mechanism which preferably consists of a spindle piece to be driven in a rotary manner to which are connected at least one fixed pin and at least one pivotable pin, means being present to pilot the pivotable pin into a gripping positlon and into an open position with respect to the fixed pin. This gripping jaw mechanism conveys the onions, for example through knives which cut off the top and root end.

To transfer the onion presented in an oriented manner and with the top and root end removed, use can be made of a transfer mechanism comprising a spindle to be driven in a rotary manner two pivotable levers linked to it, means of pivoting the levers away from each other and towards each other and gripping elements at the end of the lever intended for gripping the onions by the axial end parts.

Onions which are intended to be processed into rings, little blocks and similar pieces are usually peeled, i.e. the dry skins and the outermost fleshy skin are removed and the top and root end are cut off them. A peeling loss of approx. 30% is considered acceptable. onions intended for a drying process do not have to be completely clean, i.e. only the dry skins and the top and root end have to be removed, as a result of which the peeling loss may remain limited to approx. 10–15%. The peeling off of the layers and the cutting off of the top and root end is still often done by hand. There exist cutting machines in which onions speared on pins are carried passed rotating knives to cut the tops and root ends off them. The onions damaged by the pins in general exhibit reduced keeping properties. In addition there are commerical machines for cutting off the skins by means of carborundum-containing elements or peeling them off by means of knives. Processing with these machines results in severely damaged onions and high peeling losses. The peeled product has by no means the high quality and beautiful appearance of onions peeled by hand. In addition, the subjection of onions to a lye or steam treatment to loosen the outermost skins is known. The peeling with lye results in a waste water problem and the appearance of the peeled product is less attractive. Steam peeling has the disadvantage that a part of the product bursts open in the sudden expansion of the steam bath and that the onions acquire an irregular appearance. Known peeling systems intended to limit the manual work to a minimum result in too many poor products (top and root end removed at the wrong point, skins not entirely removed, and the like) and too many other disadvantages (inter alia, high peeling loss, only applicable for a particular size, small capacity in terms of peeled product per person per hour, less good external quality, limited keeping properties, waste water problems and the like). On the other hand, manual peeling is expensive and entails the risk per se of microbiological contamination.

There is therefore also a need for a peeling device for onions which does not have the above difficulties and for which use can be made of the said alignment appliance according to the invention for the feed.

An appliance for the peeling of onions whose top and root end have been removed by hand or mechanically is characterised for this purpose by a "pop-out" mechanism formed by two gripping faces which can grip the outermost skin or skins and can give the onions the opportunity of escaping from the outermost skins in the axial direction when pressure is exerted on the gripping faces or a lateral force is exerted on the onions.

There are various possibilities for the embodiment of the pop-out mechanism. Thus, the onions could be brought successively between two moving flexible transport elements, the outermost skins gripped by means of a profiled piece, the onions being pushed out of the gripped skins by a moving or stationary disc or strip projecting between the transport elements. In a much simpler construction, however, the said gripping faces consist of a disc, to some extent flexible, which projects from a fixed support and a pushing strip displaceable towards the flexible strip.

The top and root end pieces should be removed from the onions beforehand, the reason being that the onions leave their outmost skins during the popping out via an opening in the skin formed by the cutting off of the top or root end. In order to cause this cutting off to take place fully automatically immediately before the popping out, use is made of two knives placed next to each other at a certain distance, the pushing strip having a displacement path which is situated between the knives. It is of importance that the machine is suitable for fairly large and fairly small onions and that the knives always take up the desired position with respect to the top and root ends to be removed. It is therefore preferable that the knives are each mounted on an arm, which arms are pivotable laterally against spring action, each arm having a pilot pin to be brought into contact with the onions to cause the pivoting of the arms to a position in which the knives are situated in the correct position with respect to the top and root and parts to be removed.

In order to expose the onions during the alignment immediately before the removal of top and root ends to a treatment which results in as a result of which the outermost fleshy skin becoming to some extent becomes loose, a pipe for the supply of steam may extend parallel to and in the vicinity of the alignment transporter.

BRIEF DESCRIPTION OF THE DRAWINGS

The invention will now be explained in more detail on the basis of Figures in which an exemplary embodiment is shown.

DETAILED DESCRIPTION OF THE DRAWINGS

Figure 1:
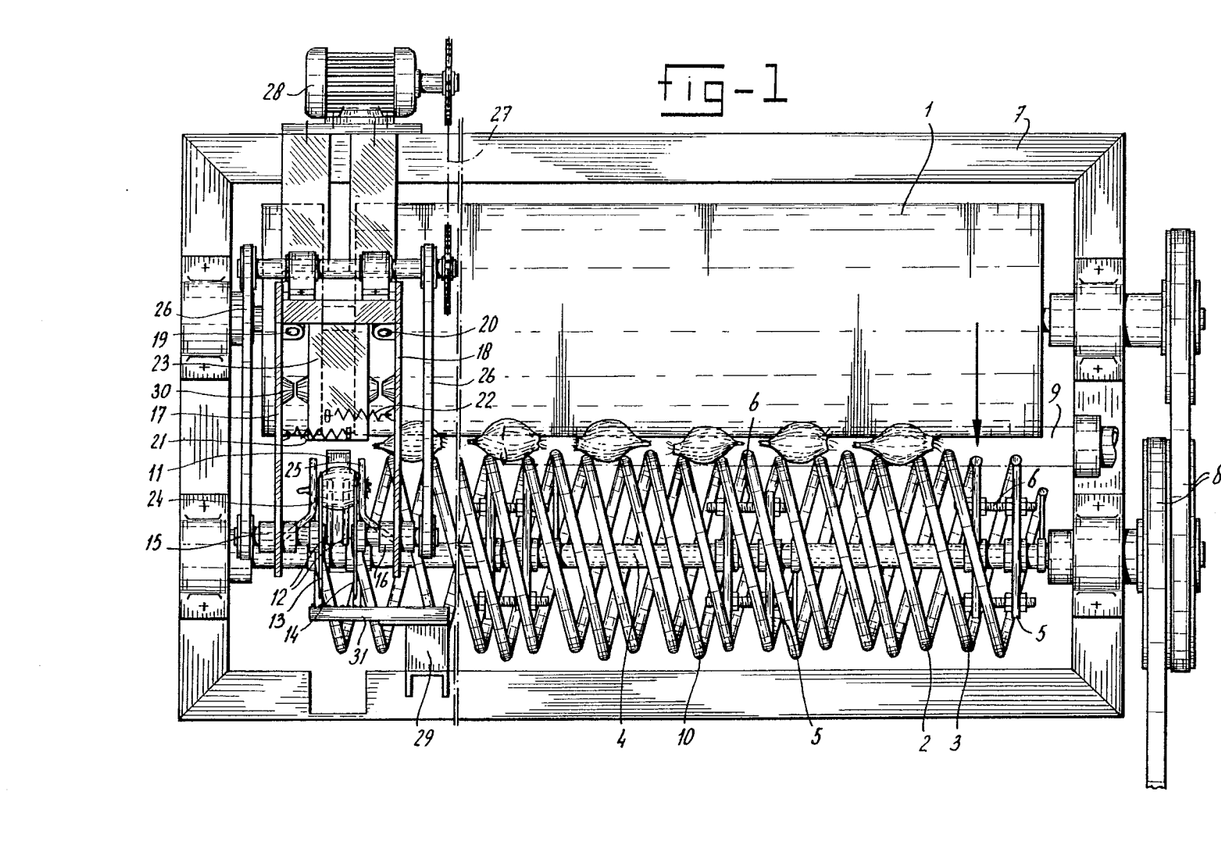
FIG. 1 shows a plan view of an alignment and peeling machine.
Figure 2:
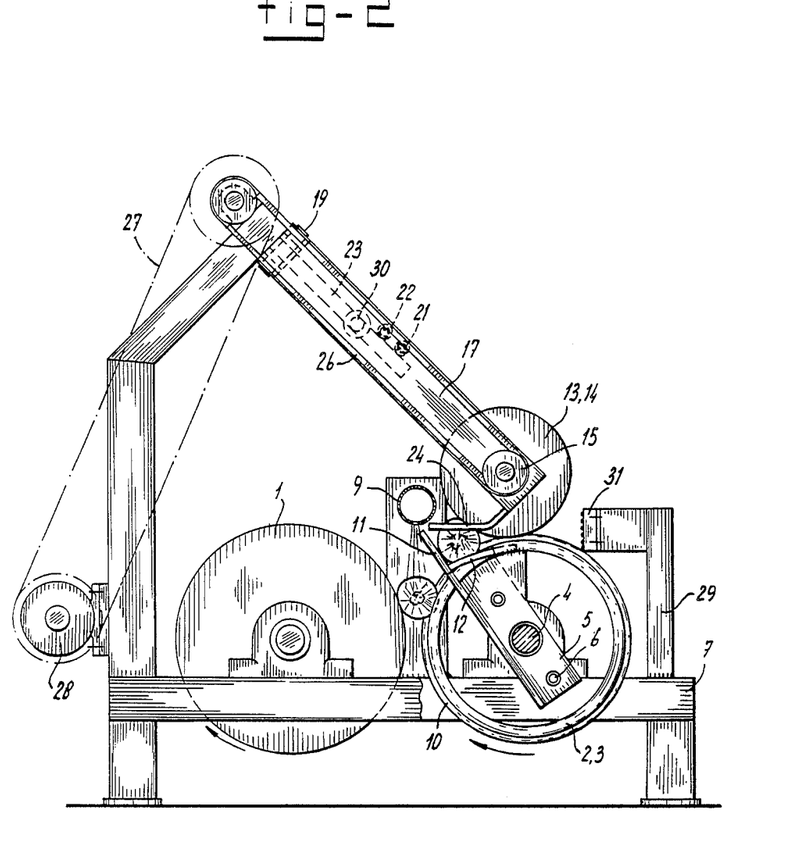
FIG. 2 shows a front view of this machine from the left-hand side in FIG. 1.
Figure 3A:
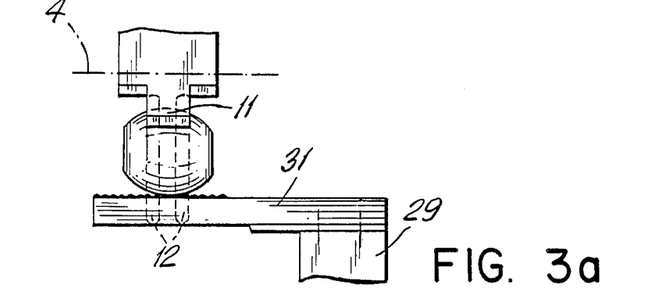
FIG. 3 shows successively three different positions of the pop-out mechanism for the popping of the onions out of the outermost skins.
Figure 3B:
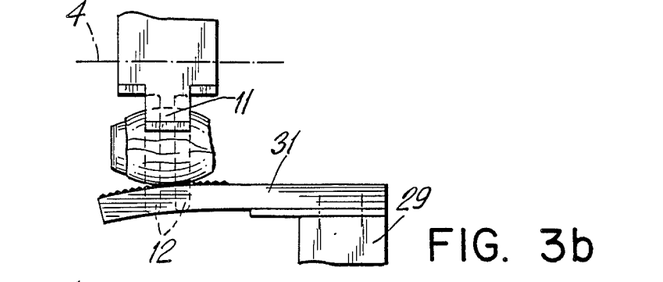
Figure 3C:
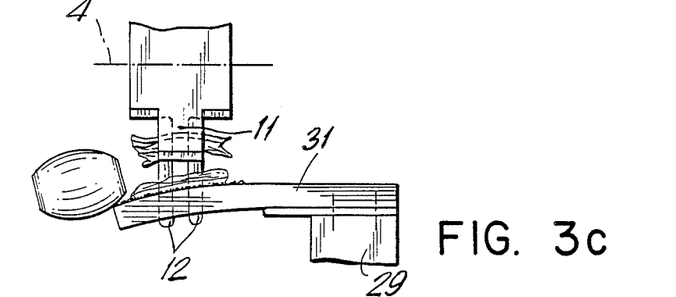

The onion peeling machine shown in FIGS. 1 to 3 incl. comprise (a) an alignment mechanism for orienting the onions into the processing position, (b) means of heat treatment for loosening the outermost skins of the onions, (c) a cutting mechanism for the removal of top and root end of the oriented onions, and (d) a pop-out mechanism for popping or shooting out the onions axially from the outermost skins.

The invention is concerned in the first place with the alignment mechanism. This mechanism brings the onions into a well oriented position in which the further operations can be carried out without problems. Examples of the operations are the said removal of top and root ends, and the popping of the onions axially out of the outermost skins. It must be emphasised that other facilities may also follow the alignment mechanism, for example a mechanism for notching the onions around the circumference and removing them in the radial direction from the divided outer skins or a mechanism for cutting the onions into slices. In other words, the alignment appliance now to be described can be used in conjunction with any known or unknown mechanism for which aligned presentation to the mechanism is essential for a good operation.

The alignment mechanism consists of a closed roller 1 and a helical roller formed by two helical rods 2, 3 which are mounted on a spindle 4 by means of plates 5 with a mutually adjustable axial spacing, the spacing thereof being capable of being altered by the screw bolt 6. The closed roller 1 and the helical roller 2, 3 are mounted next to such other in a frame 7. They are driven by belts or chains 8 which lead to a common motor (not shown). The direction of rotation of the roller 1 and the helical rollers 2, 3 is indicated in FIG. 2, but the possibility is not excluded of the rollers 1 or 2, 3 rotating in opposite directions.

The onions to be peeled are fed through a feed mechanism (not shown) in the direction of the arrow fnto the gap between the solid roller 1 and the helical roller 2, 3. The feed mechanism meters out the onions one by one in a manner such that one onion always lands between the helices at points where the distance between them is minimum. In view of the fact that it has emerged that the combination of the solid roller 1 and the helical roller 2, 3 also fulfills metering functions, a metering feed mechanism is not always necessary.

The circumferential velocity of the solid roller is chosen somewhat larger than that of the helical roller, which is beneficial but not necessary for orienting the onions in a manner such that top and root end extends parallel to the axial direction of the roller.

Near the gap between the solid roller and the helical roller there extends a pipe 9 provided with openings for the supplying of steam to the onions. The helical roller transports the aligned onions to the cutting mechanism, and during this transport the onions are subjected to the influence of the steam. The outermost fleshy skin is softened as a result of this so that the flesh inside the said soft skin can easily be released therefrom. The residence time of the onions in the steam is, for example, 30 seconds. The possibility is not excluded that the onions are subjected to the heat treatment before they are fed to the aligning, cutting and popping-out mechanism. Certain onions on the whole do not require to be subjected to a heat treatment.

Between the helices 2, 3 there is a fill-up helix 10 which prevents the onions landing on the unintended points between the helices. The reasons for this is that there must be some distance between the aligned onions to avoid overlapping. In the event that the alignment appliance has only to be suitable for onions of a particular size and adjustment is not required, instead of the spirals 2, 3 and 10 s single tube may be ussd in which a helical groove is provided. A helically wound strip also gives the same alignment effect.

The onions also undergo the desired alignment effect if they are introduced inside the helices 2, 3, in which case the roller 1 could be omitted and the fill-up spiral 10 would have to have a diameter which is somewhat less than the diameter of the helices 2, 3. Incidently, if the appliance is intended for onions of particular dimensions and adjustment of the helices 2, 3 is not necessary, the helix 2, 3 could be replaced by a cylindrical tube with a helical groove in the outer surface of the jacket.

The alignment appliance shown in the figures in which the onions are aligned between the outer surface of the helices 2, 3 and the roller 1 is, however, to be preferred because the onions can easily be transferred at the end of the alignment path to a processing mechanism (cutting mechanism for top and root end, pop-out mechanism, cutting mechanism for cutting the onions into slices and the like).

At the end of the helices 2, 3 a scooping up mechanism may be fitted consisting of a pushing strip 11 which is mounted on the final plate 5 and to which two carrier pins 12 are welded at a mutual distance. As is evident in particular from FIG. 2, in the case of rotating spirals 2 and 3 each onion which has arrived at the end of the said helices will be moved away from the gap between the solid roller 1 and the helical roller 2, 3 in the direction of the cutting mechanism for the top and root end to be removed.

This mechanism comprises two circular knives 13, 14 each mounted on a spindle, the bearing 15, 16 of which is mounted on an arm 17 or 18.

Each of the arms is linked by a hinge 19 or 20 to the frame section in a manner such that it can pivot in the lateral direction, tension springs 21 or 22 pulling the arms towards each other. In addition to being fixed to an arm 19 or 20, these springs are also fixed to a fixed plate 23. Stop elements 30 determine the minimum distance between the arms 17, 18.

To each arm 17 or 18 a pilot pin 24 or 25 is fixed which comes into contact with the onions scooped up by a scooping up mechanism 11, 12, as a result of which the arms 17 or 18 are moved apart against the action of the springs 21 or 22 to a position in which the knives 13, 14 mounted on the said arms are located in the correct position with respect to the top and root end to be removed. The pilot pins may be fork-shaped. The knives driven by a motor 28 via bolts 26 and chains 27 cut off the top and root and of the onion.

The onion is pushed by the assembly of pushing strip 11 and carrier pins 12 to a pop-out mechanism. This comprises an elastic strip 31, consisting, for example, of a stiff rubber or spring steel covered with a rubber layer, mounted on a support 29. An onion which is located between the pushing strip 11 and the elastic strip 31 deflected to some extent and pretreated outer skins are gripped by the rough surface of the strip reacts to the pressure exerted by the onion popping out sideways from the outermost skins in the axial direction, and this is illustrated in FIG. 3.

The strip 31 may be a spring-load stiff pivoting strip. To prevent the strips 11 and 31 damaging each other in the absence of an onion, the stop devices may be encountered.

The peeled onions which have popped out land in a box or in a removal transporter not known while the outermost skins fall into a wase box.

It is of importance that the onions introduced in the correct position by the alignment mechanism are displaced by means of the system consisting of the pushing strip and carrier pins without the centre line of the onions taking up a different direction.

The embodiment shown with an elastic strip 31 is simple and cheap. The pop-out principle can, however, be applied in many kinds of ways. Known mechanisms for the removal of the outermost skins may also follow the alignment appliance, for example a mechanism in which a circumferential cut in the outermost skins is applied with a knife and the onions are driven out of the incised skins in the radial direction (see for example the UK Patent Specification No. 821,315).

It is usually preferable that the onion is exposed to steam or heat treatment before the top and root end are cut off it. The cutting surfaces will then not be impaired. Instead of subjecting the onions to a steam treatment, flame treatment may be used. The possibility exists of carrying out the steam or heat treatment beforehand, i.e. outside the machine described.

Figure 4:
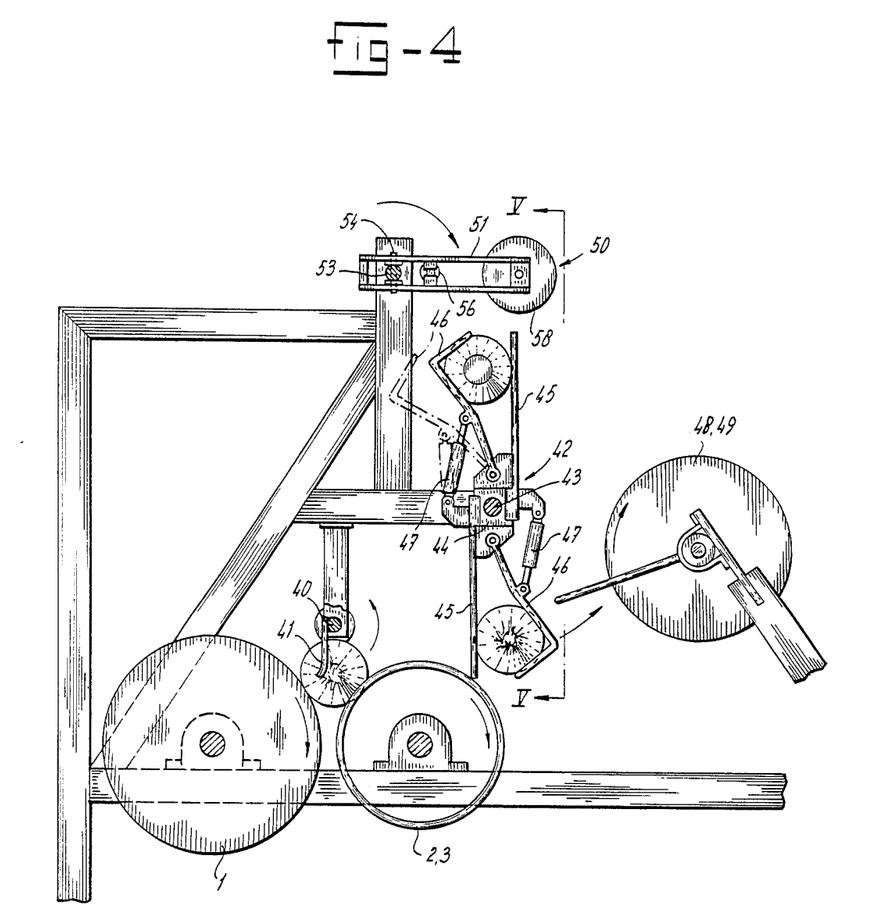
FIG. 4 shows a front view of an alternative embodiment of means for the removal from the alignment machine and oriented presentation of the onions to the subsequent processing appliances.
Figure 5:
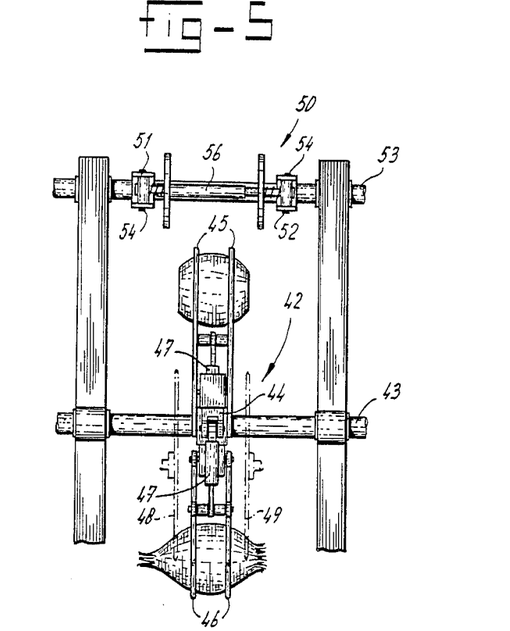
FIG. 5 shows a side view along the line V—V in FIG. 4.
Figure 6:
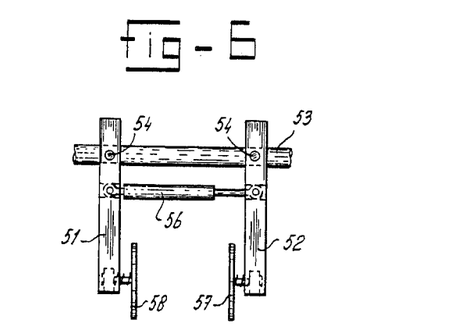
FIG. 6 shows a plan view of a transfer mechanism of the embodiment according to FIGS. 4 and 5.

In the alternative embodiment according to FIGS. 4, 5 and 6, there is fitted above the gap between the helical construction grooved roller 2, 3 and the roller 1 a spindle 40, to be driven in a rotary manner, which is provided with two fingers 41 situated close to each other which moves an onion from the gap between the roller 1 and the construction 2, 3 upwards in the direction of a gripping jaw mechanism 42. This comprises a spindle 43, to be driven in a rotary manner, a piece 44 mounted theron, two pairs of pins 45 permanently mounted on the piece 44 and two pairs of pivotable, hooked-shaped pins 46 mounted on the piece 44. By means of hydraulic or pneumatic cylinders 47 the pins 46 can be brought into an open position or a closed gripping position with respect to the pins 45. The gripping position is indicated in FIG. 4 at the top and bottom of the rotation path by full lines, while the open position (mutual angle between the pins 45, 46 approx. 45°) is indicated by dotted lines. The operation of the cylinders 47 takes place by means of microswitches (not shown) which react to certain positions of the rotating piece 44. The synchronisation of the rotary movements of the spindles 40 and 43 (spindle 40 rotates twice as fast as spindle 43) is such that at the moment when the open jaw 45, 46 approaches the helical construction 2, 3 during the downward part of the rotary movement, the fingers 41 push an onion into the jaw, after which the jaw is closed and entrained. During the upward path of the rotary movement the gripped onion passes two knives 48, 49 which cut off the top and root end and which are to be compared in terms of operation with the knives 13, 14 of the embodiment according to FIG. 2. The onion, the axial ends of which now consists of flat surfaces, moves with a defined orientation towards a transfer mechansim 50 consisting of two levers 51, 52 which are pivotably mounted on a spindle, to be driven in a rotary manner, the pivoting spindles 54, 55 being perpendicular to the rotation spindle 53. Between the levers 51, 52 there is a fitted a pneumatic or hydraulic cylinder 56 which can pivot the levers away from each other or towards each other. At the end of each lever a gripping disc 57 or 58 is spring mounted. An onion can be gripped between these discs if the levers 51, 52 are pivoted towards each other by the cylinder. The spindle 53 rotates with twice the speed of the spindle 43. The directions of rotation of the spindles 43 and 53 are so synchronised with respect to each other and the operation of the cylinders 47 and 56 are so adjusted to each other by microswitches or the like which react to the angular position of the spindles 43 or 53 that the onion presented by a gripping jaw 45, 46 is taken up by the discs 57, 58 which are caused to grip the flat onion surfaces and are rotated further around the spindle 53. The directions of rotation are always indicated by arrows.

The onion gripped between the discs 57, 58 is passed, for example, to a mechanism (not shown) for the cutting of slices. The levers 51, 52 are pushed away from each other as soon as the onion has passed the slice cutting mechanism.

It will be clear that within the scope of the claims various modifications of the machine shown and described are possible.

What is claimed is:

1. An appliance for the alignment of onions or other vegetable bulbs which comprises:
    a. a cylinder with an outer surface and an inner surface, with a helical groove in the outer surface thereof;
    b. a roller provided at a distance next to said cylinder; and
    c. a driving means to rotate the cylinder and the roller; wherein both the width of the helical groove and the distance between the cylinder and the roller are less than the diameter and axial length of the onions or other vegetable bulbs to be aligned; said cylinder and roller being so configured as to align said onions or other vegetable bulbs to a position in which a line through a top end and a root end of said onion or other vegetable bulb takes up a particular alignment.

2. An appliance for the alignment of onions or other vegetable bulbs which comprises:
    a. a cylinder with an inside surface and an outside surface, with a helical groove on the inside surface thereof; and
    b. a means for rotating said cylinder, the width of the helical groove being less than a diameter and axial lengths of the onions or other vegetable bulbs to be aligned; said helical groove in said cylinder being so configured as to align said onions or other vegetable bulbs to a position in which a line through a top end and a root end of said onion or other vegetable bulb takes up a particular alignment.

3. An appliance according to claim 1 or claim 2 wherein the cylinder consists of two helical rods of equal diameter which are mounted on a common spindle to be rotated in a rotary manner and between which the helical groove is situated, wherein there exists an axial distance between the helical rods which is adjustable.

4. An appliance according to claim 3, wherein a fill-up spiral extends between two parts of windings of the said helical rods.

5. An appliance for the peeling of onions, which appliance is provided with an alignment appliance according to claim 1, in which the alignment appliance is followed by a pop-out mechanism formed by two gripping faces which can grip an outermost skin or skins of the onions or other vegetable bulbs and can give the onions or other vegetable bulbs the opportunity of escaping from the outermost skins in the axial direction when pressure is exerted on the gripping faces or a lateral force is exerted on the onions or other vegetable bulbs.

6. The appliance according to claim 5, wherein the said gripping faces consist of a flexible strip, which projects from a fixed support, and a push strip dispaceable towards the flexible strip.

7. The appliance according to claim 6, which also comprises two knives placed next to each other at a certain distance for the removal of top and root end sections of the onions or other vegetable bulbs, the push strip having a displacement path which is situated between the knives.

8. The appliance according to claim 7, wherein the knives are each mounted on an arm which is pivotable laterally against spring action, each arm having a pilot pin to be brought into contact with the onions or other vegetable bulbs to cause a pivoting of the arms to a position in which the knives are situated in correct position with respect to the top and root end part to be removed.

9. The appliance according to claim 1, which also comprises a pipe for the supply of steam, said pipe extending parallel and in the vicinity of the alignment transporter.

10. The appliance according to claim 1 which also comprises a gripping jaw mechanism for the picking up of the onions or other vegetable bulbs in an oriented position from the alignment appliance and feeding the onions or other vegetable bulbs to a subsequent processing station.

11. The appliance according to claim 10, wherein the gripping jaw mechanism consists of a spindle piece to be driven in a rotary manner to which at least one fixed pin and at least one pivoting pin are connected, means being present to pivot the pivoting pin into a gripping position and into an open position with respect to the fixed pin.

12. The appliance according to claim 11, which also comprises a transfer mechanism for the transferring of the onions or other vegetable bulbs, which transfer mechanism comprises a spindle to be driven in a rotary manner, two levers connected pivotably thereto, means to pivot the levers away from each other and towards each other, and gripping elements mounted on the end of the levers intended for gripping the actual end pieces of the onions or other vegetable bulbs, from which top and root end have been removed.

13. An appliance for the peeling of onions, which appliance is provided with an alignment appliance according to claim 2, in which the alignment appliance is followed by a pop-out mechanism formed by two gripping faces which can grip an outermost skin or skins of the onions or other vegetable bulbs and can give the onions or other vegetable bulbs the opportunity of escaping from the outermost skins in the axial direction when pressure is exerted on the gripping faces or a lateral force is exerted on the onions or other vegetable bulbs.

14. The appliance according to claim 13, wherein the said gripping faces consist of a flexible strip which projects from a fixed support, and a push strip displaceable towards the flexible strip.

15. The appliance according to claim 14, which also comprises two knives placed next to each other at a certain distance for the removal of top and root end sections of the onions or other vegetable bulbs, the push strip having a displacement path which is situated between the kinves.

16. The appliance according to claim 15, wherein the knives are each mounted on an arm which is pivotable laterally against spring action each arm having a pilot pin to be brought into contact with the onions or other vegetable bulbs to cause a pivoting of the arms to a position in which the knives are situated in correct position with respect to the top and root end parts to be removed.

17. The appliance according to claim 2 which further comprises a pipe for the supply of steam, said pipe extending parallel and in the vicinity of the alignment transporter.

18. The appliance according to claim 2, which also comprises a gripping jaw mechanism for the picking up of the onions or other vegetable bulbs in an oriented position from the alignment appliance and feeding the onions or other vegetable bulbs to a subsequent processing station.

19. The appliance according to claim 18, wherein the gripping jaw mechanism consists of a spindle piece to be driven in a rotary manner to which at least one fixed pin and at least one pivoting pin are connected, means being present to pivot the pivoting pin into a gripping position and into an open position with respect to the fixed pin.

20. The appliance according to claim 19, which also comprises a transfer mechanism for the transferring of the onions or other vegetable bulbs, which transfer mechanism comprises a spindle to be driven in a rotary manner, two levers connected pivotably thereto, means to pivot the levers away from each other and towards each other, and gripping elements mounted on the end of the levers intended for gripping the actual end pieces of the onions or other vegetable bulbs, from which the top and root end have been removed.

* * * * *